US009256982B2

(12) United States Patent
Sharp et al.

(10) Patent No.: US 9,256,982 B2
(45) Date of Patent: Feb. 9, 2016

(54) MEDICAL IMAGE RENDERING (75) Inventors: Toby Sharp, Cambridge (GB); Antonio Criminisi, Cambridge (GB); Khan Mohammad Siddiqui, Highland, MD (US)

(73) Assignee: Microsoft Technology Licensing, LLC, Redmond, WA (US)

(*) Notice: Subject to any disclaimer, the term of this patent is extended or adjusted under 35 U.S.C. 154(b) by 959 days.

(21) Appl. No.: 12/725,811

(22) Filed: Mar. 17, 2010

(65) Prior Publication Data
US 2011/0228997 A1 Sep. 22, 2011

(51) Int. Cl.
G06T 15/30 (2011.01)
G06T 15/00 (2011.01)
G06T 19/00 (2011.01)
G06K 9/00 (2006.01)

(52) U.S. Cl.
CPC .............. G06T 19/00 (2013.01); G06T 15/30 (2013.01); G06T 2200/24 (2013.01); G06T 2207/10081 (2013.01); G06T 2210/12 (2013.01); G06T 2219/004 (2013.01); G06T 2219/2012 (2013.01)

(58) Field of Classification Search
None
See application file for complete search history.

(56) References Cited

U.S. PATENT DOCUMENTS

| 6,823,204 B2* | 11/2004 | Grass et al. ............ 600/407 |
| 2002/0118869 A1* | 8/2002 | Knoplioch ............ G06T 7/60 382/131 |
| 2006/0110021 A1 | 5/2006 | Luo et al. |
| 2006/0239553 A1* | 10/2006 | Florin et al. ............ 382/173 |
| 2007/0081712 A1 | 4/2007 | Huang et al. |
| 2007/0276214 A1* | 11/2007 | Dachille et al. ............ 600/407 |
| 2008/0037850 A1* | 2/2008 | Assmann et al. ............ 382/131 |
| 2008/0154565 A1 | 6/2008 | Florin et al. |
| 2009/0010507 A1 | 1/2009 | Geng |
| 2009/0048482 A1 | 2/2009 | Hong et al. |
| 2009/0096807 A1 | 4/2009 | Silverstein et al. |
| 2009/0279756 A1 | 11/2009 | Gindele et al. |
| 2010/0080434 A1* | 4/2010 | Seifert et al. ............ 382/131 |
| 2012/0194517 A1 | 8/2012 | Izadi et al. |

OTHER PUBLICATIONS

Beyer, "GPU-based Multi-Volume Rendering of Complex Data in Neuroscience and Neurosurgery", retrieved on Jan. 15, 2010 at <<http://www.cg.tuwien.ac.at/research/publications/2009/beyer-2009-gpu/beyer-2009-gpu-paper.pdf>>, Vienna University of Technology, Doctoral Dissertation, Oct. 2009, pp. 1-117.

(Continued)

Primary Examiner — Anita Coupe
(74) Attorney, Agent, or Firm — Steve Wight; Judy Yee; Micky Minhas (57) ABSTRACT Medical image rendering is described. In an embodiment a medical image visualization engine receives results from an organ recognition system which provide estimated organ centers, bounding boxes and organ classification labels for a given medical image. In examples the visualization engine uses the organ recognition system results to select appropriate transfer functions, bounding regions, clipping planes and camera locations in order to optimally view an organ. For example, a rendering engine uses the selections to render a two-dimensional image of medical diagnostic quality with minimal user input. In an embodiment a graphical user interface populates a list of organs detected in a medical image and a clinician is able to select one organ and immediately be presented with the optimal view of that organ. In an example opacity of background regions of the medical image may be adjusted to provide context for organs presented in a foreground region.

20 Claims, 9 Drawing Sheets (56) References Cited

OTHER PUBLICATIONS

Borland, Clarke, Fielding, Taylor, "Volumetric depth peeling for medical image display", retrieved on Jan. 15, 2010 at <<http://citeseerx.ist.psu.edu/viewdoc/summary?doi=10.1.1.99.6480>>, Visualization and data analysis, vol. 6060, Jan. 16, 2006, pp. 1-10.
Bruckner, Groller, "Exploded Views for Volume Data", retrieved on Jan. 15, 2010 at <<http://ieeexplore.ieee.org/stamp/stamp.jsp?tp=&arnumber=4015467&isnumber=4015412>>, IEEE Transactions on Visualization and Computer Graphics, vol. 12, No. 5, 2006, pp. 1077-1084.
Bullitt, Aylward, "Volume Rendering of Segmented Tubular Objects", Medical Image Computing and Computer-Assisted Intervention (MICCAI), 2001, pp. 161-198.
Criminisi, Shotton, Bucciarelli, Siddiqui, "Automatic Semantic Parsing of CT Scans via Multiple Randomized Decision Trees", Radiological Society of North America (RSNA), PowerPoint presentation, Dec. 2009, pp. 1-13.
Criminisi, Shotton, Bucciarelli, Siddiqui, "Automatic Semantic Parsing of CT Scans via Multiple Randomized Decision Trees", Radiological Society of North America (RSNA), Abstract, Dec. 2009, pp. 1-2.
Criminisi, Shotton, Bucciarelli, "Decision Forests with Long-Range Spatial Context for Organ Localization in CT Volumes", retrieved on Jan. 15, 2010 at <<http://research.microsoft.com/pubs/81675/Criminisi_MICCAI_PMMIA_2009_.pdf, Workshop on Probabilistic Models for Medical Image Analysis (MICCAI), 2009, pp. 1-12.
Criminisi, Sharp, Blake, "GeoS: Geodesic Image Segmentation", retrieved on Jan. 15, 2010 at <<http://research.microsoft.com/pubs/71446/Criminisi_eccv2008.pdf>>, Springer-Verlag Berlin, European Conference on Computer Vision (ECCV), Part 1, vol. 5302, 2008, pp. 99-112.
del Rio, Fischer, Kobele, Hoffmann, Duffner, Tatagiba, Straber, Bartz, "Intuitive volume classification in medical augmented reality (AR)", retrieved on Jan. 15, 2010 at <<http://www.egms.de/static/de/journals/curac/2006-1/curac000008.shtml>>, German Medical Science, Current Topics in Computer and Robot Assisted Surgery (CURAC), Sep. 20, 2006, pp. 1-9.
Engel, Sommer, Ertl, "A Framework for Interactive Hardware Accelerated Remote 3D-Visualization", Proceedings of EG/IEEE TCVG Symposium on Visualization (VisSympp), May 2000, pp. 167-177 and 291.
Engel, Hastreiter, Tomandl, Eberhardt, Ertl, "Combining Local and Remote Visualization Techniques for Interactive Volume Rendering in Medical Applications", retrieved on Jan. 15, 2010 at <<http://ieeexplore.ieee.org/stamp/stamp.jsp?arnumber=00885729>>, IEEE Computer Society Press, Conference on Visualization, 2000, pp. 449-452.
Engel, Kraus, Ertl, "High-Quality Pre-Integrated Volume Rendering Using Hardware-Accelerated Pixel Shading", retrieved on Jan. 15, 2010 at <<http://delivery.acm.org/10.1145/390000/383515/p9-engel.pdf?key1=383515&key2=3335553621&coll=GUIDE&dl=GUIDE&CFID=72997113&CFTOKEN=95673515>>, ACM, Conference on Graphics Hardware, 2001, pp. 9-16.
Engel, Hadwiger, Kniss, Lefohn, Salama, Weiskopf, "Real-Time Volume Graphics", retrieved on Jan. 15, 2010 at <<http://delivery.acm.org/10.1145/1110000/1103929/cs28.pdf?key1=1103929&key2=2381653621&coll=GUIDE&dl=GUIDE&CFID=71351530&CFTOKEN=13988399>> ACM Conference on Computer Graphics and Interactive Techniques (SIGGRAPH), Course Notes 28, 2004, pp. 1-166.
"fovia.com", retrieved on Jan. 15, 2010 at <<http://www.fovia.com/>>, Fovia, 2005, pp. 1.
Guthe, Wand, Gonser, Straber, "Interactive Rendering of Large Volume Data Sets", retrieved on Jan. 15, 2010 at <<http://www.mpi-int.mpg.de/~mwand/papers/vis02.pdf>>, IEEE Computer Society, Conference on Visualization, 2002, pp. 53-60.
Hardenbergh, Buchbinder, Thurston, Lombardi, Harris, "Integrated 3D Visualization of fMRI and DTI tractography", retrieved on Jan. 15, 2010 at <<http://www.jch.com/volumes/dtifmri.htm>>, IEEE Visualization, Oct. 2005, pp. 94-96.
Hastreiter, Rezk-Salalma, Tomandl, Eberhardt, Ertl, "Interactive Direct Volume Rendering of the Inner Ear for the Planning of Neurosurgery", retrieved on Jan. 15, 2010 at <<http://www.vis.uni-stuttgart.de/ger/research/pub/pub1999/BVM99.pdf>>, 1999, pp. 192-196.
Humphreys, Houston, Ng, Frank, Ahern, Kirchner, Klosowski, "Chromium: A Stream-Processing Framework for Interactive Rendering on Clusters", retrieved on Jan. 15, 2010 at <<http://www-graphics.stanford.edu/papers/cr/cr_lowquality.pdf>>, ACM Transactions on Graphics, vol. 21, No. 3, 2002, pp. 693-702.
Kainz, Grabner, Bornik, Hauswiesner, Muehl, Schmalstieg, "Ray Casting of Multiple Volumetric Datasets with Polyhedral Boundaries on Manycore GPUs", retrieved on Jan. 15, 2010 at <<http://delivery.acm.org/10.1145/1620000/1618498/a152-kainz.pdf?key1=1618498&key2=4076553621&coll=ACM&d=ACM&CFID=15151515&CFTOKEN=6184618>>, ACM Transactions on Graphics, vol. 28, No. 5, Article 152, Dec. 2009, pp. 1-9.
Kniss, Kindlmann, Hansen, "Multi-Dimensional Transfer Functions for Interactive Volume Rendering", retrieved on Jan. 15, 2010 at <<http://www.cs.utah.edu/~jmk/kniss_tvcg02-small.pdf>>, IEEE Educational Activities Department, Transactions on Visualization and Computer Graphics, vol. 8, No. 3, 2002, pp. 270-285.
Kruger, Westermann, "Acceleration Techniques for GPU-based Volume Rendering", retrieved on Jan. 15, 2010 at <<http://delivery.acm.org/10.1145/1090000/1081482/20300038.pdf?key1=1081482&key2=4527553621&coll=GUIDE&dl=GUIDE&CFID=73001878&CFTOKEN=97173740, IEEE Computer Society, Visualization Conference, Oct. 19, 2003, pp. 287-292.
Lacroute, Levoy, "Fast Volume Rendering Using a Shear-Warp Factorization of the Viewing Transformation", retrieved on Jan. 15, 2010 at <<http://www.cs.virginia.edu/~gfx/Courses/2002/BigData/papers/Volume%20Rendering/Fast%20Volume%20Rendering%20Using%20a%20Shear-Warp%20Factorization%20of%20the%20Viewing%20Transformation.pdf>>, ACM, Conference on Computer Graphics and Interactive Techniques, 1994, pp. 451-458.
Lacroute, "Real-Time Volume Rendering on Shared Memory Multiprocessors Using the Shear-Warp Factorization", retrieved on Jan. 15, 2010 at <<http://delivery.acm.org/10.1145/220000/218331/p15-lacroute.pdf?key1=218331&key2=1757553621&coll=GUIDE&dl=GUIDE&CFID=73002777&CFTOKEN=99713525>>, ACM, Parallel Rendering Symposium, 1995, pp. 15-22.
Levoy, "Display of Surfaces from Volume Data", retrieved on Jan. 15, 2010 at <<http://www-graphics.stanford.edu/papers/volume-cga88/volume.pdf>>, IEEE Computer Society Press, Computer Graphics and Applications, vol. 8, No. 3, 1988, pp. 29-37.
Levoy, "Volume Rendering by Adaptive Refinement", retrieved on Jan. 15, 2010 at <<http://citeseer.ist.psu.edu/cache/papers/cs/3765/http:zSzzSzwww.cse.fsu.eduzSz%7EerlebachzSzcourseszSzscivizzSzpaperszSzvolumetric_paperszSzPAPERSzSzLEVOYzSzLEV90CzSzLEVOY90C.pdf/levoy89volume.pdf>>, Springer-Verlag New York, The Visual Computer: International Journal of Computer Graphics, vol. 6, No. 1, 1990, pp. 2-7.
Li, Mueller, Kaufman, "Empty Space Skipping and Occlusion Clipping for Texture-based Volume Rendering", retrieved on Jan. 15, 2010 at <<http://citeseerx.ist.psu.edu/viewdoc/summary?doi=10.1.1.75.7206>>, IEEE Computer Society, Conference on Visualization, 2003, pp. 1-8.
Ljung, "Efficient Methods for Direct Volume Rendering of Large Data Sets", Linkoping University, Sweden, Doctoral Thesis, 2006, pp. 1-77.
Lum, Ma, Clyne, "Texture Hardware Assisted Rendering of Time-Varying Volume Data", retrieved on Jan. 15, 2010 at <<http://citeseerx.ist.psu.edu/viewdoc/summary?doi=10.1.1.90.9817>>, IEEE Computer Society, Conference on Visualization, 2001, pp. 263-270.
Ma, Painter, Hansen, Krogh, "A Data Distributed, Parallel Algorithm for Ray-Traced Volume Rendering", retrieved on Jan. 15, 2010 at <<http://delivery.acm.org/10.1145/170000/166183/p15-ma.pdf?key1=166183&key2=5288553621&coll=GUIDE&dl=GUIDE (56) References Cited

OTHER PUBLICATIONS

&CFID=71345538&CFTOKEN=62659826>>, ACM, Symposium on Parallel Rendering, 1993, pp. 15-22 and 105.

Neumann, "Interactive Volume Rendering on a Multicomputer", retrieved on Jan. 15, 2010 at <<http://delivery.acm.org/10.1145/150000/147170/p87-neumann.pdf?key1=147170 &key2=3598553621&coll=GUIDE&dl=GUIDE &CFID=71345781&CFTOKEN=32476404>>, ACM, Symposium on Interactive 3D Graphics, 1992, pp. 87-93.

Patidar, Narayanan, "Ray Casting Deformable Models on the GPU", retrieved on Jan. 15, 2010 at <<http://cvit.iiit.ac.in/projects/gpuproject/rccudazone.pdf>>, IEEE Computer Society, Conference on Computer Vision, Graphics & Image Processing (ICVGIP), 2008, pp. 481-488.

Persson, Dahlstrom, Smedby, Brismar, "Volume rendering of three-dimensional drip infusion CT cholangiography in patients with suspected obstructive biliary disease: a retrospective study", The British Journal of Radiology, vol. 78, Dec. 2005, pp. 1078-1085.

Rautek, Bruckner, Grolier, "Semantic Layers for Illustrative Volume Rendering", retrieved on Jan. 15, 2010 at <<http://ieeexplore.ieee.org/stamp/stamp.jsp?tp=&arnumber=4376159 &isnumber=4376125>>, IEEE Transactions on Visualization and Computer Graphics, vol. 13, No. 6, Nov. 2007, pp. 1336-1343.

Rezk-Salama, Engel, Bauer, Greiner, Ertl, "Interactive Volume Rendering on Standard PC Graphics Hardware Using Multi-Textures and Multi-Stage Rasterization", retrieved on Jan. 15, 2010 at <<http://delivery.acm.org/10.1145/350000/348238/p109-rezk-salama.pdf?key1=348238&key2=3298553621&coll=GUIDE&dl=GUIDE &CFID=73006064&CFTOKEN=38097735>>, ACM, Conference on Graphics Hardware, 2000, pp. 109-118.

Robler, Botchen, Ertl, "Dynamic Shader Generation for Flexible Multi-Volume Visualization", retrieved on Jan. 15, 2010 at <<http://www.vis.uni-stuttgart.de/ger/research/pub/pub2008/pacificvis08-roessler.pdf>>, IEEE, Pacific Visualization Symposium (PacificVis), 2008, pp. 17-24.

Robler, Tejada, Fangmeier, Ertl, Knauff, "GPU-based Multi-Volume Rendering for the Visualization of Functional Brain Images", retrieved on Jan. 15, 2010 at <<http://www.vis.uni-stuttgart.de/ger/research/pub/pub2006/simvis06-roessler.pdf>>, Proceedings of SimVis, 2006, pp. 305-318.

Sato, Westin, Bhalerao, Nakajima, Shiraga, Tamura, Kikinis, "Tissue Classification Based on 3D Local Intensity Structures for Volume Rendering", retrieved on Jan. 15, 2010 at <<http://ieeexplore.ieee.org/stamp/stamp.jsp?tp=&arnumber=856997&isnumber=18616>>, IEEE Transactions on Visualization and Computer Graphics, vol. 6, No. 2, Apr. 2000, pp. 160-180.

Silva, Comba, Callahan, Bernardon, "A Survey of GPU-Based Volume Rendering of Unstructured Grids", retrieved on Jan. 15, 2010 at <<http://www.sci.utah.edu/~csilva/papers/rita2005.pdf>>, Revista de Informatica Teorica e Aplicada (RITA), vol. 12, No. 2, 2005, pp. 9-29.

Singh, Gupta, Levoy, "Parallel Visualization Algorithms: Performance and Architectural Implications", retrieved on Jan. 15, 2010 at <<http://ieeexplore.ieee.org/stamp/stamp.jsp?arnumber=00299410>>, IEEE Computer Society Press, Computer, vol. 27, No. 7, Jul. 1994, pp. 45-55.

Smelyanskiy, Holmes, Chhugani, Larson, Carmean, Hanson, Dubey, Augustine, Kim, Kyker, Lee, Nguyen, Seiler, Robb, "Mapping High-Fidelity Volume Rendering for Medical Imaging to CPU, GPU and Many-Core Architectures", retrieved on Jan. 15, 2010 at <<http://techresearch.intel.com/UserFiles/en-us/File.terascale/Mayo_IEEE_VIS2009_FINAL.pdf<<, IEEE Transactions on Visualization and Computer Graphics, vol. 15, No. 6, Nov. 2009, pp. 1563-1570.

Strengert, Magallon, Weiskopf, Guthe, Ertl, "Large Volume Visualization of Compressed Time-Dependent Datasets on GPU Clusters", retrieved on Jan. 15, 2010 at <<http://www.vis.uni-stuttgart.de/ger/research/pub/pub2005/pc05-strengert.pdf>>, Elsevier Science Publishers, Amsterdam, Parallel Computing, vol. 31, No. 2, Feb. 2005, pp. 205-219.

Tam, Healey, Flak, Cahoon, "Volume Rendering of Abdominal Aortic Aneurysms", retrieved on Jan. 15, 2010 at http://ieeexplore.ieee.org/stamp/stamp.jsp?arnumber=00663855>>, IEEE Computer Society Press, Conference on Visualization, 1997, pp. 43-52.

Tatarchuk, Shopf, DeCorob, "Advanced interactive medical visualization on the GPU", retrieved on Jan. 15, 2010 at <<http://www.cs.princeton.edu/gfx/pubs/Tatarchuk_2008_AIM/Tatarchuk2008.pdf>>, Elsevier Publishing, Journal of Parallel and Distributed Computing, vol. 68, 2008, pp. 1319-1328.

"thevisualMD", retrieved on Jan. 15, 2010 at <<http://www.thevisualmd.com/>>, pp. 1.

Tomandl, Hastreiter, Rezk-Salama, Engel, Ertl, Huk, Naraghi, Ganslandt, Nimsky, Eberhardt, "Local and Remote Visualization Techniques for Interactive Direct Volume Rendering in Neuroradiology", retrieved on Jan. 15, 2010 at <<http://radiographics.rsna.org/content/21/6/1561.full>>, RSNA, RadioGraphics, vol. 21, No. 6, Nov. 2001, pp. 1561-1572.

Totsuka, Levoy, "Frequency Domain Volume Rendering", retrieved on Jan. 15, 2010 at <<http://www-graphics.stanford.edu/papers/fvr/totsuka-fvr-sig93.pdf>>, ACM, Conference on Computer Graphics and Interactive Techniques, 1993, pp. 271-278.

Viola, Kanitsar, Grolier, "GPU-based Frequency Domain Volume Rendering", retrieved on Jan. 15, 2010 at <<http://citeseerx.ist.psu.edu/viewdoc/download?doi=10.1.1.3.6848&rep=rep1 &type=pdf>>, ACM, Conference on Computer Graphics, 2004, pp. 55-64.

Waage, "State of the Art Parallel Computing in Visualization using CUDA and OpenCL", retrieved on Jan. 15, 2010 at <<http://www.ii.uib.no/vis/teaching/vis-seminar/2009-fall/waage/waage_star.pdf>>, The Eurographics Association, Seminar in Visualization, 2008, pp. 1-7.

Wald, Friedrich, Marmitt, Slusallek, Seidel, "Faster Isosurface Ray Tracing Using Implicit KD-Trees", retrieved on Jan. 15, 2010 at <<http://ieeexplore.ieee.org/stamp/stamp.jsp?arnumber=01471693>>, IEEE Transactions on Visualization and Computer Graphics, vol. 11, No. 5, Sep. 2005, pp. 562-572.

Westermann, Ertl, "Efficiently Using Graphics Hardware in Volume Rendering Applications", retrieved on Jan. 15, 2010 at <<http://www.viss.uni-stuttgart.de/ger/research/pub/pub1998/SIG-GRAPH98.pdf>>, ACM, Conference on Computer Graphics and Interactive Techniques, 1998, pp. 169-177.

Yagel, "Volume Viewing Algorithms: Survey", retrieved on Jan. 15, 2010 at <<http://www.cs.duke.edu/courses/spring03/cps296.8/papers/YagelViewingSurvey.pdf>>, In International Spring School on Visualization., pp. 1-22.

"International Search Report & Written Opinion for PCT Patent Application No. PCT/US2013/077736", Mailed Date: Mar. 27, 2014, Filed Date: Dec. 26, 2013, 15 pages.

Higo, et al., "A Hand-held Photometric Stereo Camera for 3-D Modeling", In International Conference on Computer Vision, Sep. 29, 2009, pp. 1234-1241.

Anderson, et al., "Augmenting Depth Camera Output Using Photometric Stereo", In Conference on Machine Vision Applications, Jun. 13, 2011, pp. 369-372.

* cited by examiner

MEDICAL IMAGE RENDERING

BACKGROUND

Medical images are produced by many types of medical equipment such as magnetic resonance imaging (MRI) scanners, computed tomography (CT) scanners, single photon emission computed tomography (SPECT) scanners, positron emission tomography (PET) scanners and ultra sound scanners. Many such medical images are of three or higher dimensions and in order for clinicians to visualize those images they need to be rendered onto two-dimensional displays. This rendering process is typically computationally expensive, complex and time consuming. In addition, the process needs to be accurate to enable medical diagnoses to be made.

The large quantity of data contained within such medical images means that a clinician or other user needs to spend a significant amount of time searching for the relevant part of the image. For example, in the case of a medical scan a clinician can spend a significant amount of time manually searching for the relevant part of the body (e.g. heart, kidney, blood vessels) before looking for certain features (e.g. signs of cancer or anatomical anomalies) that can help a diagnosis. Typically the clinician is required to operate sliders to navigate the visual data. In addition, it is often difficult for users to remove clutter from the image and focus on the regions of interest. In order to obtain diagnostic clarity for example, a clinician may need to manually resize and center an image, manually select different transfer functions used in the rendering process, manually select different clipping planes by trial and error and so on. This process may often take the majority of the time taken to make the complete diagnosis from the medical image. Indeed, for organs that vary in location widely between patients such as the spleen and organs which are non-normal in size and shape due to anomalies, injuries or disease this process may be very time consuming.

Some techniques exist for the automatic detection and recognition of organs in medical images, which can reduce the time spent manually searching an image. For example, geometric methods include template matching and convolution techniques. For medical images, geometrically meaningful features can, for example, be used for the segmentation of the aorta and the airway tree. However, such geometric approaches have problems capturing invariance with respect to deformations (e.g. due to pathologies), changes in viewing geometry (e.g. cropping) and changes in intensity. In addition, they do not generalize to highly deformable structures such as some blood vessels.

Another example is an atlas-based technique. An atlas is a hand-classified image, which is mapped to a subject image by deforming the atlas until it closely resembles the subject. This technique is therefore dependent on the availability of good atlases. In addition, the conceptual simplicity of such algorithms is in contrast to the requirement for accurate, deformable algorithms for registering the atlas with the subject. In medical applications, a problem with n-dimensional registration is in selecting the appropriate number of degrees of freedom of the underlying geometric transformation; especially as it depends on the level of rigidity of each organ/tissue. In addition, the optimal choice of the reference atlas can be complex (e.g. selecting separate atlases for an adult male body, a child, or a woman, each of which can be contrast enhanced or not). Atlas-based techniques can also be computationally inefficient.

The embodiments described below are not limited to implementations which solve any or all of the disadvantages of known medical image rendering systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Medical image rendering is described. In an embodiment a medical image visualization engine receives results from an organ recognition system which provide estimated organ bounding boxes and organ classification labels for a given (three dimensional or higher dimensional medical image. In examples the visualization engine uses the organ recognition system results to select appropriate transfer functions, bounding regions, clipping planes and camera locations in order to optimally view a particular organ. For example, a rendering engine uses the selections to render a two-dimensional image of medical diagnostic quality with minimal user input. In an embodiment a graphical user interface automatically populates a list of organs detected in a medical image and a clinician is able to select one organ and immediately be presented with the optimal view of that organ. In an example opacity of background regions of the medical image may be adjusted to provide context for organs presented in a foreground region.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a medical image rendering system using ray-casting, the system described is provided as an example and not a limitation. As those skilled in the art will appreciate, the present examples are suitable for application in a variety of different types of medical image rendering systems.

Figure 1:
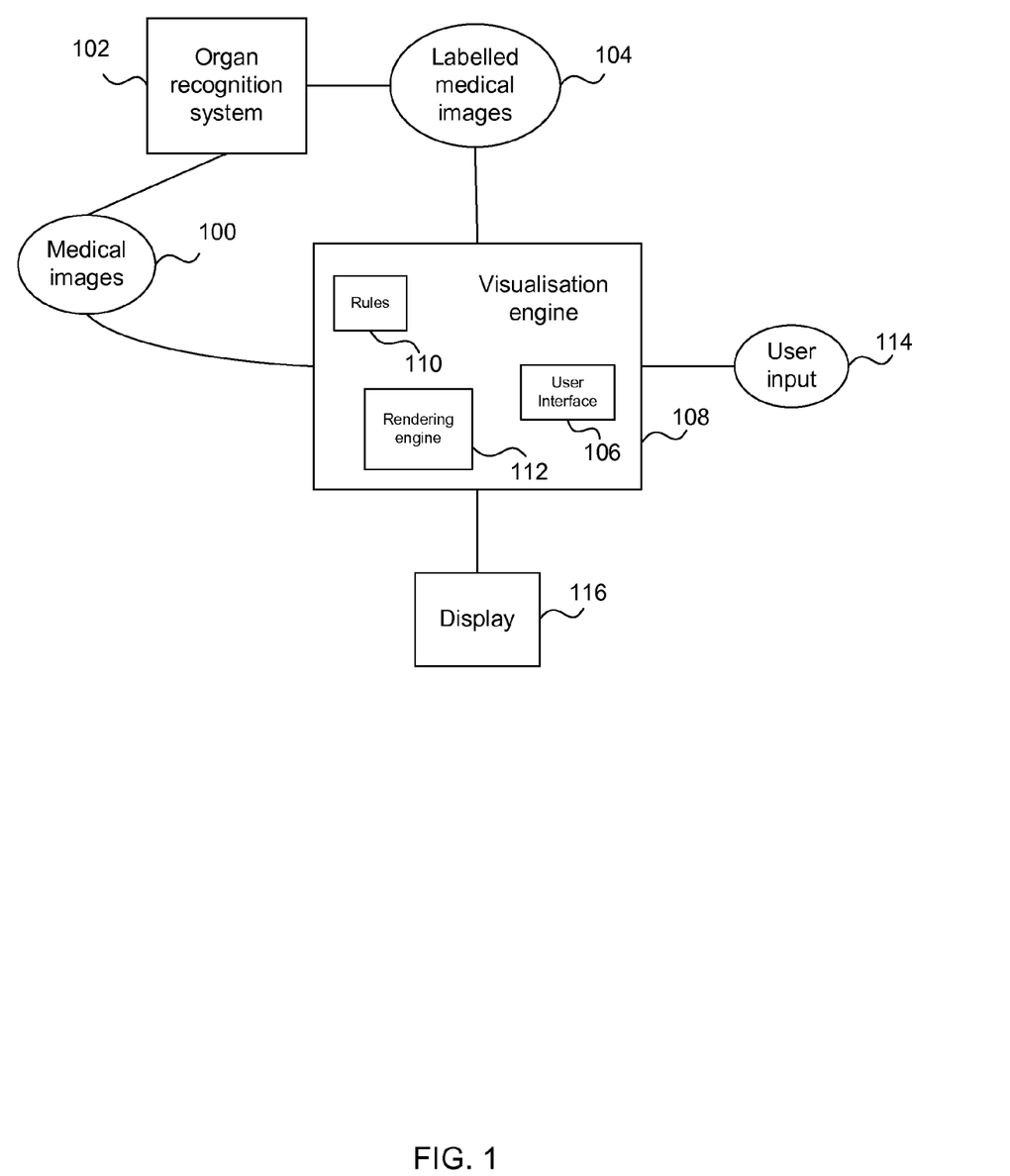
FIG. 1 is a schematic diagram of a medical image rendering system.

FIG. 1 is a schematic diagram of a medical image rendering system comprising a computer implemented organ recognition system 102 and a computer implemented visualization engine 108 which may be integral or independent of one another and connected by any suitable communications link. The organ recognition system 102 is arranged to take medical images 100 of two or higher dimensions and to label those images to produce labeled medical images 104. The medical images 100 may be two or higher dimensional volumetric images representing the internal structure of a human or animal body (or a sequence of such images). In some examples described below the medical images are of at least three dimensions although this is not essential. The visualization engine 108 may also be used with two-dimensional images.

The output of the organ recognition system 102 comprises labeled medical images 104. For example, each image element of a medical image may be assigned an organ classification label by the organ recognition system to indicate which organ from a specified plurality of organs the image element is from. A non-exhaustive list of organs is: heart mitral valve, heart left ventricle, heart right ventricle, abdominal aorta, left renal arteries, right renal arteries, liver, spleen, left lung, right lung, left kidney, right kidney, spine. The term "organ" is used herein to refer to a structure of the human or animal body at any scale. That is, an organ may be the heart or a structure which is part of the heart such as the mitral valve. Together with each image element label the organ recognition system may provide a probability associated with that image element label. This probability value may be provided as a variance or standard deviation value for example and provides an indication of how certain the organ recognition system is that the label assigned to the particular image element is correct. The image element labels thus provide information about the presence, location and extent of organs in the medical images.

The organ recognition system 102 may also be arranged to provide an estimated organ center position for each organ it detects. For example, if a medical image is labeled with three organ labels then three organ centers may be estimated one for each organ label. The organ recognition system 102 may be arranged to provide an estimated bounding region or bounding box for each organ it detects. The estimated bounding region is a volume which tightly contains or encompasses an organ; it may be a box or any other 3D form. The estimated bounding region may be used to compute the estimated organ center position.

Any suitable organ recognition system 102 may be used which provides one or more of the outputs mentioned above. For example, the organ recognition system described in U.S. patent application Ser. No. 12/697,785 entitled "Automatic Identification of Image Features" filed on Feb. 1, 2010 and assigned to Microsoft Corporation, which is incorporated herein by reference in its entirety, may be used. Other types of organ recognition system such as those using neural networks may also be used.

The visualization engine 108 comprises rules 110, a user interface 106 and a rendering engine 112. The rules 110 may be stored in memory and may be pre-configured or may be user adjustable according to the visualization strategy to be implemented by the visualization engine 108. The user interface 108 is of any suitable type for receiving user input 114 from a user such as a clinician, radiologist, surgeon or other medical staff in order to control the visualization engine 108. The user interface 106 may also enable the user to control a display 116 at which medical images rendered by the rendering engine 112 are displayed. For example, the user interface may comprise a graphical user interface, a voice activated user interface, a multi-touch user interface, a controller-free user interface or any other type of user interface.

The rendering engine is of any type able to receive medical images 100 of two or higher dimensions and to render those into a two-dimensional image for display at display 116. Display 116 may be a computer screen, a projector, a plasma screen, a liquid crystal display screen or any other display capable of showing diagnostic quality medical images. In examples described herein the rendering engine comprises a ray-casting engine. However, this is not essential. Any type of rendering engine such as those for scan line rendering, rasterization, radiosity, and ray-tracing may be used.

Figure 2:
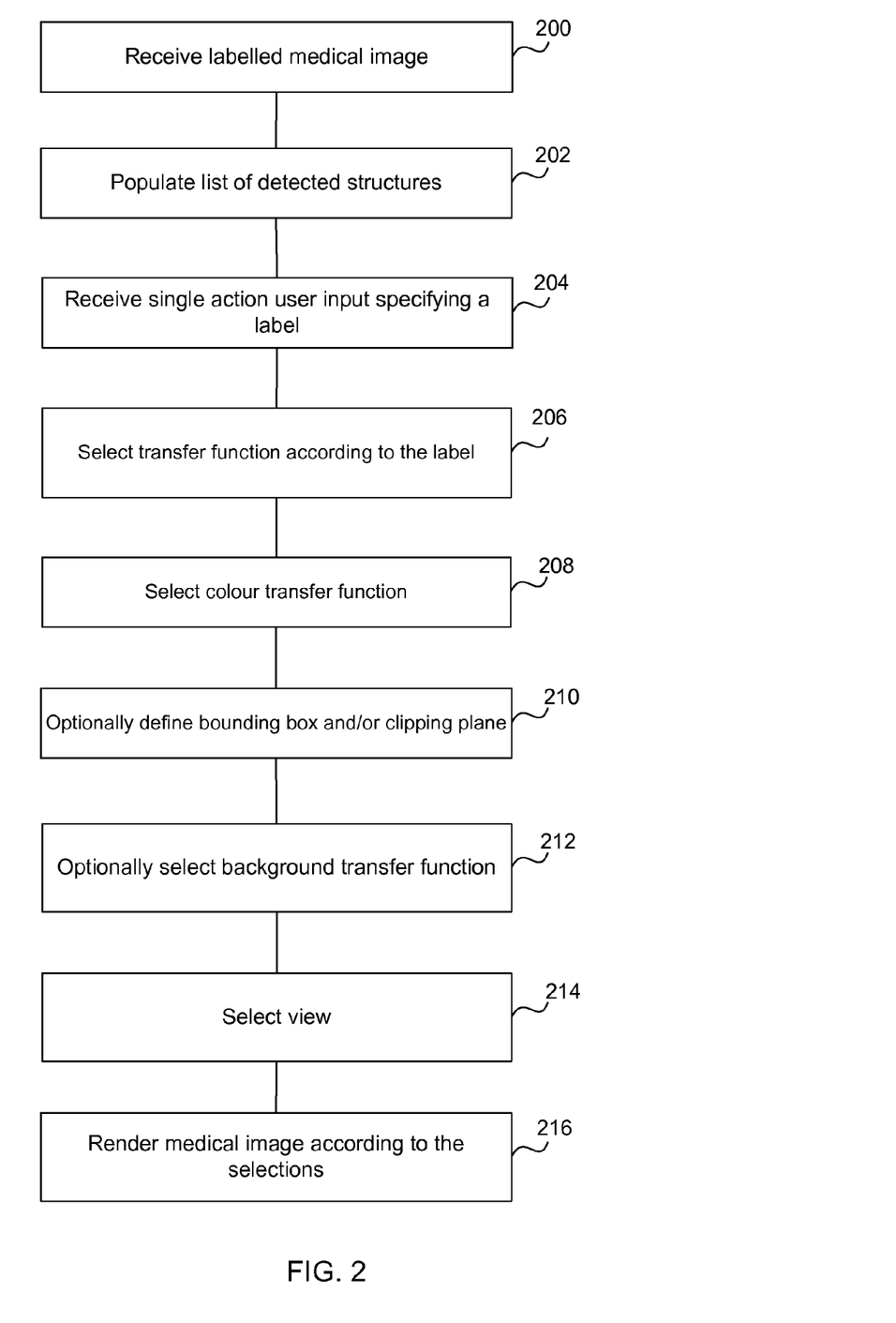
FIG. 2 is a flow diagram of a method at a visualization engine for visualizing medical images.

FIG. 2 is a flow diagram of a method at a visualization engine such as that of FIG. 1. A labeled medical image is received 200 from an organ recognition system. This labeled medical image comprises an organ label for each image element of the medical image in a foreground of the image. Those image elements which are not identified as being part of an organ are assigned a background label. The term "image element" is used to refer to a pixel, group of pixels, voxel, group of voxels, region, blob, patch or other part of an image of two or higher dimensions. Together with the labeled medical image the visualization engine receives an estimated organ center for each of the detected organs. Optionally the visualization engine also receives a probability value for each labeled image element.

Using the labeled image elements the visualization engine is able to detect one or more organs in the medical image. The user interface then populates a list of the detected structures 202 and displays this list of organ names to a user. In this way a user is able to tell at a glance which organs are present in the medical image. The user makes a user action at the user interface which is received 204. The user action specifies at least one of the organ names. For example, the user action may be a single click on a button for that organ label. The user action may also be a voice command specifying the organ name or a single touch screen input. The user action may thus indicate a foreground region of the medical image comprising those image elements which have the user selected organ label. This foreground region does not need to be contiguous.

Using the rules 110 or other specified thresholds or criteria the visualization engine 108 selects 206 a transfer function according to the label specified by the user action. For example, a plurality of specified transfer functions may be configured at the visualization engine. Different transfer functions for different types of body tissue or organs may be provided. For example, a particular type of transfer function may be provided for bone and another for air. More detail about transfer functions is described below with reference to FIG. 3.

The visualization engine 108 also selects 208 one or more color transfer functions using the rules or other thresholds or criteria in conjunction with the organ labels. The visualization engine 108 optionally defines 210 a bounding box and/or clipping plane. For example, a bounding box (or bounding region) may be determined using an organ label and examples of bounding boxes which were successful for previous medical images (i.e. training data) with the same organ label. In another example a bounding box may be determined by examining the positions of image elements having the same organ label in the medical image. The term "bounding region" is used to refer to a three dimensional form which encloses an image structure which is of interest. A clipping plane is a cross-section through a medical image, for example, to reveal internal structure of a human or animal body. The visualization engine 108 may select a clipping plane in any suitable manner. For example, the visualization engine may examine the position of image elements having the same organ label in the medical image and select a clipping plane such that the surface area of the resulting image that is covered by the image structure of interest is the highest. In another example, clipping planes that have been successful in the past for organs of the same type may be selected.

The visualization engine 108 is optionally arranged to select 212 a background transfer function to be applied to background regions of the medical image (i.e. those image elements which are not assigned the label selected by the user). For example, the background transfer function may be used to blank out the background regions of the medical image to remove clutter. In another example, the background region may be depicted as translucent by adjusting the opacity of the background region relative to the foreground region.

The visualization engine selects 214 a view or camera location which is to be used when rendering the medical image. This camera location is a virtual camera location and may be selected using the rules together with the organ centers and organ labels received from the organ recognition system. For example, the camera location may be selected such that the organ center is along a line of sight from the camera location. The camera viewing angle and focal length may also be selected, as well as its 3D orientation. The camera orientation may be chosen so as to visualize the organ in a pre-defined canonical view.

The rendering engine is then arranged to render 216 the medical image according to the selections made by the visualization engine. In this way a diagnostic quality image of the selected organ is provided in a fast and effective manner with minimal user input required. The camera location, orientation, clipping planes and transfer functions are automatically selected by the visualization engine to give the best view of the selected organ. This significantly reduces the amount of time and skill required by medical staff to operate the medical image visualization system.

Figure 3:
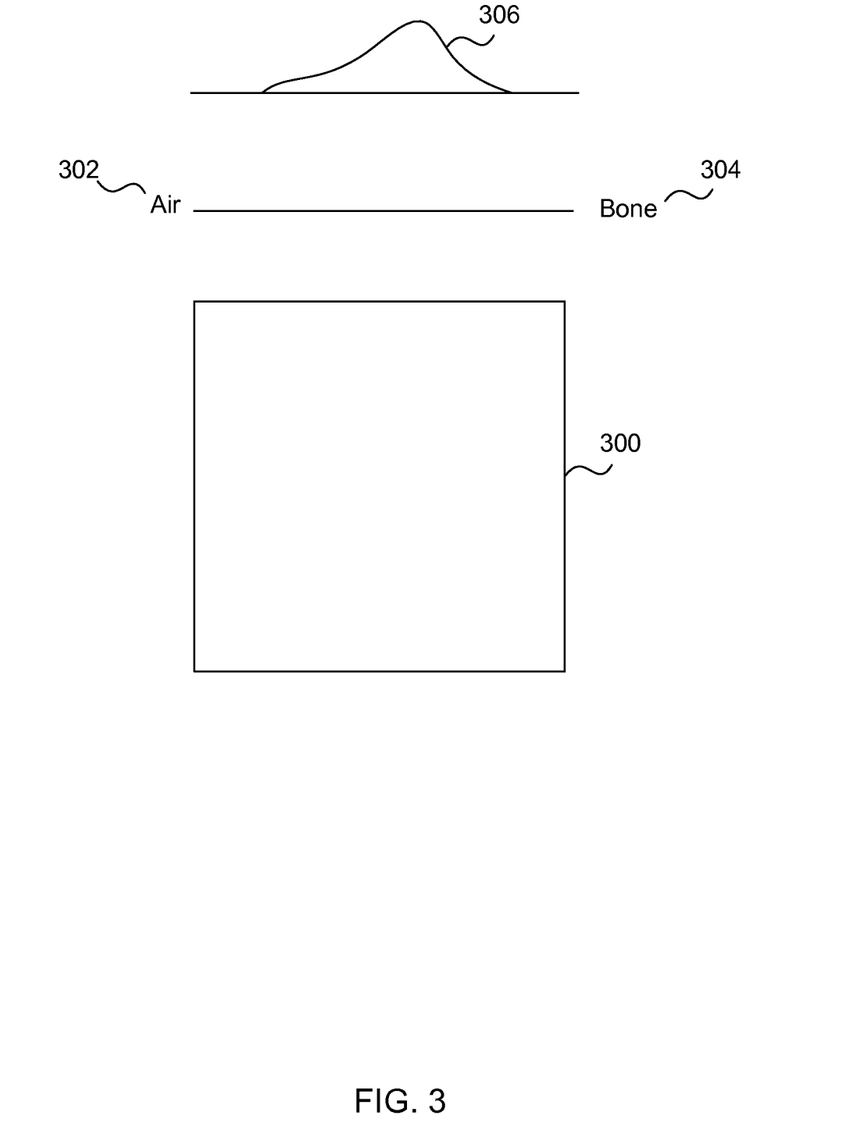
FIG. 3 is a schematic diagram of a transfer function.

As mentioned above the visualization engine is arranged to select one or more transfer functions to be used when rendering the medical image. For example, a first transfer function may be used for image elements in the foreground and another independent transfer function for image elements in the background. FIG. 2 is a schematic diagram of a transfer function 306 to be applied to an image 300. Image elements representing air 302 are mapped to low intensity for example and image elements representing tissue of density between air and bone 304 is mapped to a higher intensity for example. In this way tissue of a particular density can be isolated and other types of tissue removed from a resulting image. Different transfer functions may be used to visualize different types of tissue. Previously window level settings have been manually set by clinicians in order to view particular types of tissue. However, the visualization engine is able to automatically select appropriate window level settings as described above. In addition, color transfer functions may be selected. For example, the visualization engine can color each image element in dependence on the organ label. For example, image elements labeled as kidney can be colored blue, liver colored yellow, blood vessels colored red, background grey, etc. Furthermore, the probabilities associated with each image element can be used, such that a property of the color (such as the opacity) can be set in dependence on the probability. For example, an image element labeled as a kidney with a high probability can have a high opacity, whereas an image element classed as a kidney with a low probability can have a low opacity. This enables a user to readily view the likelihood of a portion of the image belonging to a certain organ.

In an example, the visualization engine uses two independent transfer functions, one for a foreground region and one for a background region. For example, the foreground region may comprise an image region within a bounding box or bounding region identified by the visualization engine as described above with reference to FIG. 2. This bounding box contains the organ of interest. In order to provide a clinician or other user with information about the relative position of the organ of interest in relation to other structures in the human or animal body the visualization engine may use two or more independent transfer functions. For example, the transfer function for the foreground region may be configured to isolate the organ of interest within that region by making it opaque. The transfer function for the background region may be configured to remove detail apart from that depicting tissue of a specified type or of image elements having a specified organ label. For example, a foreground region may depict a patient's liver and spleen as opaque and a background region may depict surrounding body structures with a highly translucent transfer function. Each of the foreground and background regions may have an associated color transfer function and thus the visual characteristics of each region may be individually modified.

Figure 4:
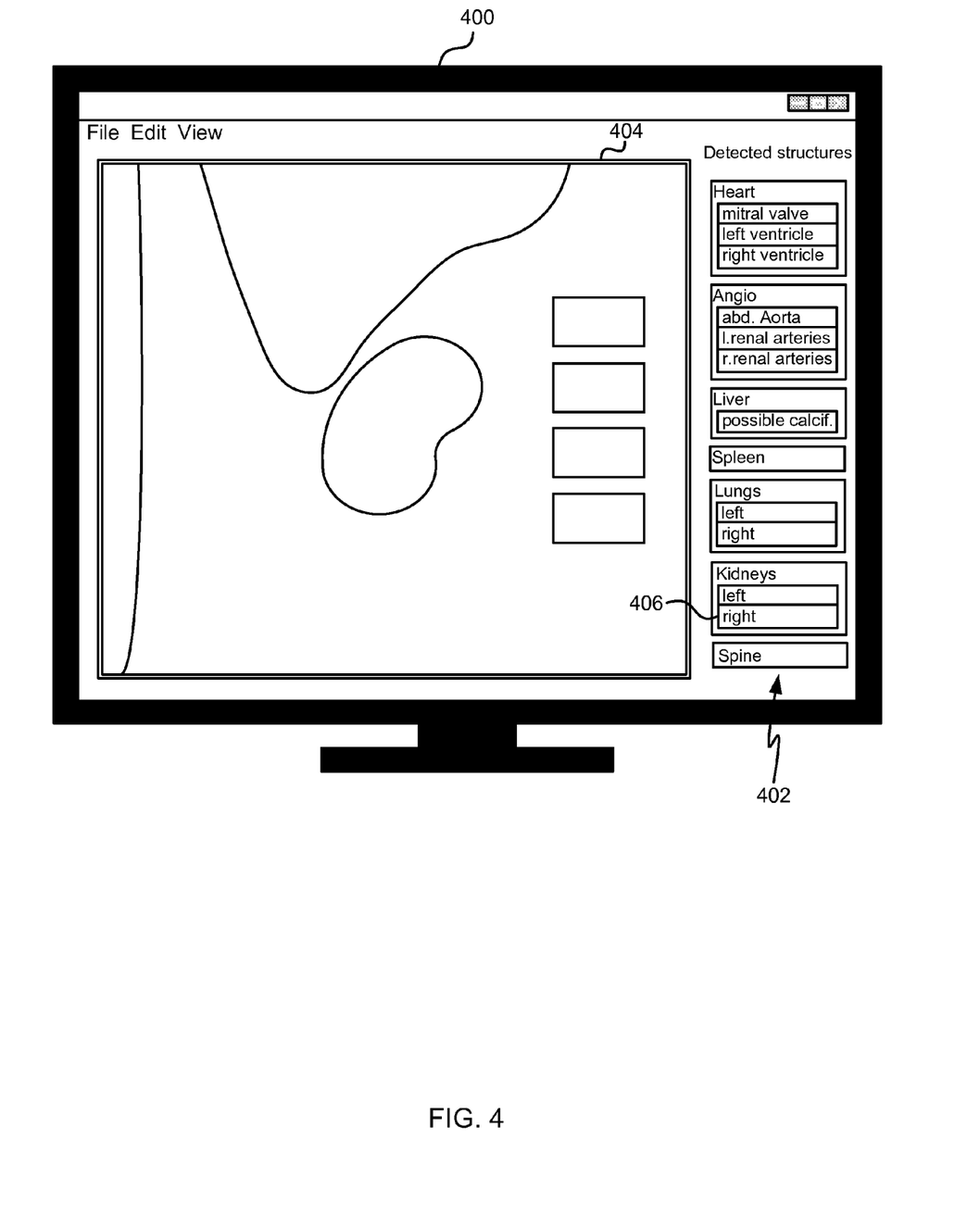
FIG. 4 is a schematic diagram of a graphical user interface displaying a rendered medical image.

FIG. 4 is a schematic diagram of a graphical user interface displaying a rendered medical image. For example, the graphical user interface may be provided by the user interface 106 of FIG. 1. FIG. 4 shows a display device 400 (such as a computer monitor) on which is shown a user interface comprising a plurality of controls 402 and a display window 404. For example, the plurality of controls 402 may comprise buttons for each of the organs detected, such that when one of the buttons is selected the image shown in the display window 404 is automatically centered on the estimated organ center. For example, FIG. 4 shows a 'right kidney' button 406, and when this is selected the image in the display window is centered on the right kidney. This enables a user to rapidly view the images of the kidney without spending the time to browse through the image to find the organ.

Figure 5:
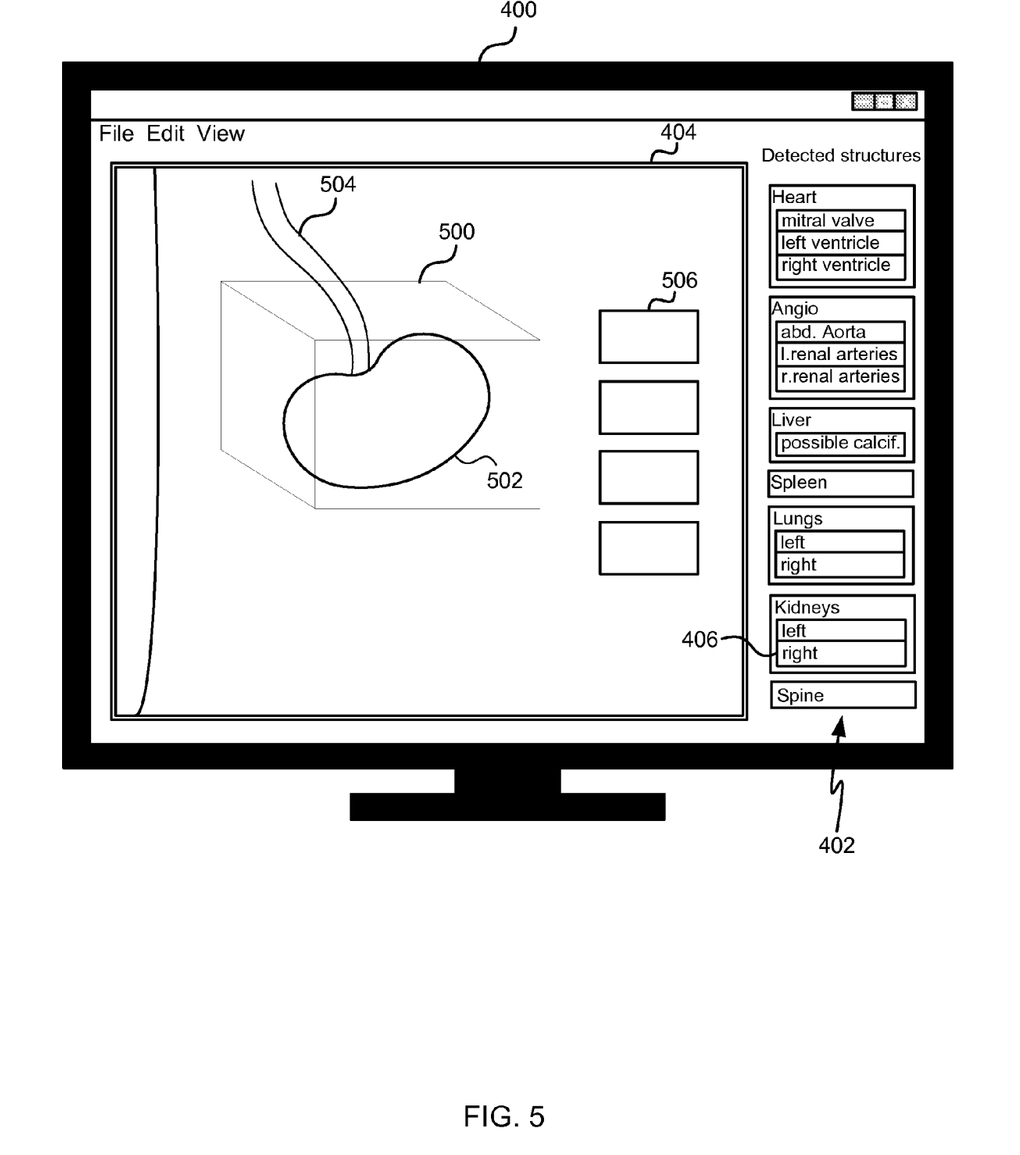
FIG. 5 is a schematic diagram of a graphical user interface displaying another rendered medical image.

FIG. 5 is a schematic diagram of a graphical user interface displaying another rendered medical image. In this case a user has selected a button 406 for the right kidney. The display window 404 is centered on the right kidney 502 shown within a bounding box 500. In this example a transfer function is used for the background region such that structures 504, 506 are visible in relation to the right kidney.

Figure 6:
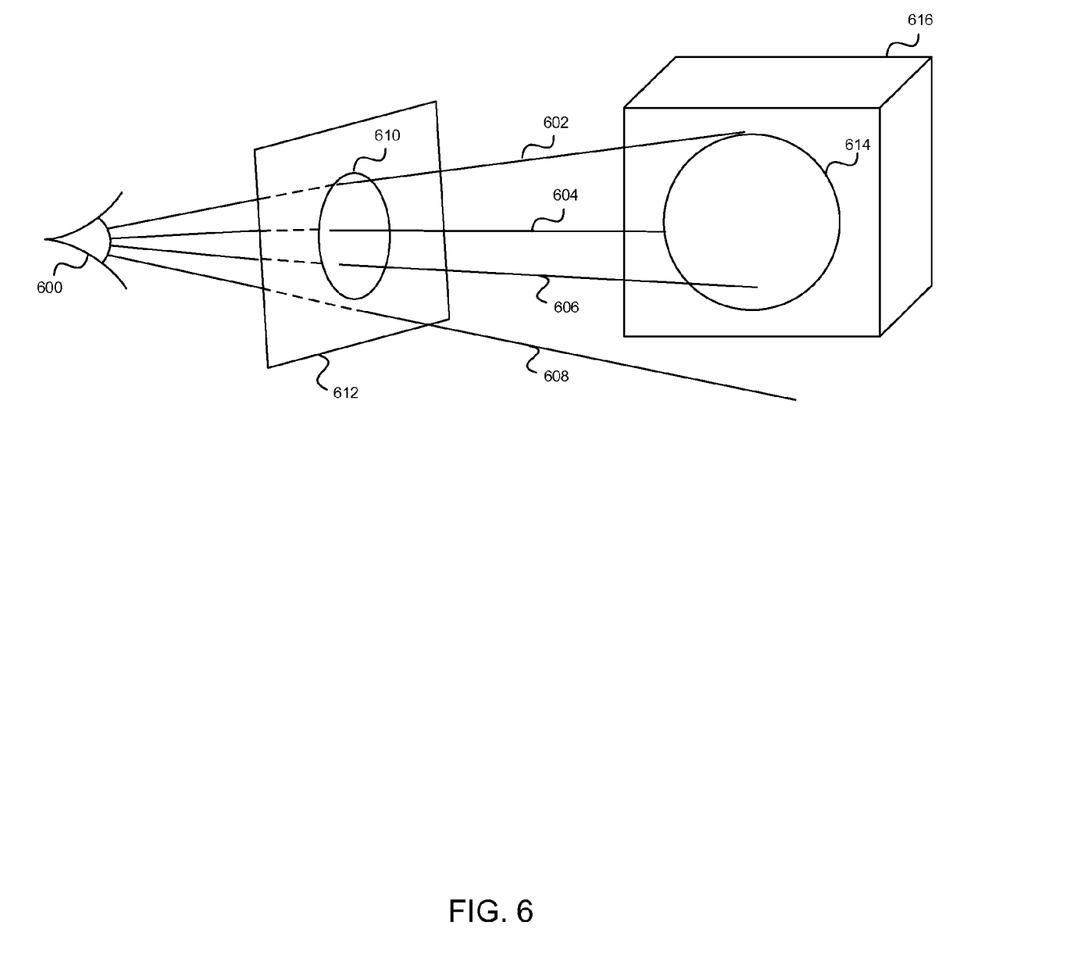
FIG. 6 is a schematic diagram of image rendering using ray-casting.

In an example the rendering engine 112 comprises a ray-casting engine. FIG. 6 is a schematic diagram of image rendering using ray-casting. An image is constructed as if a camera were situated at the viewpoint of a hypothetical viewer 600 situated at a location remote from the object being rendered. A number of rays 602, 604, 606, 608 are computed, which can be equal to the number of pixels 610 in a screen 612. The rays have their origin at the situated camera 600. The ray intersects an object 614 in a medical image 616.

Figure 7:
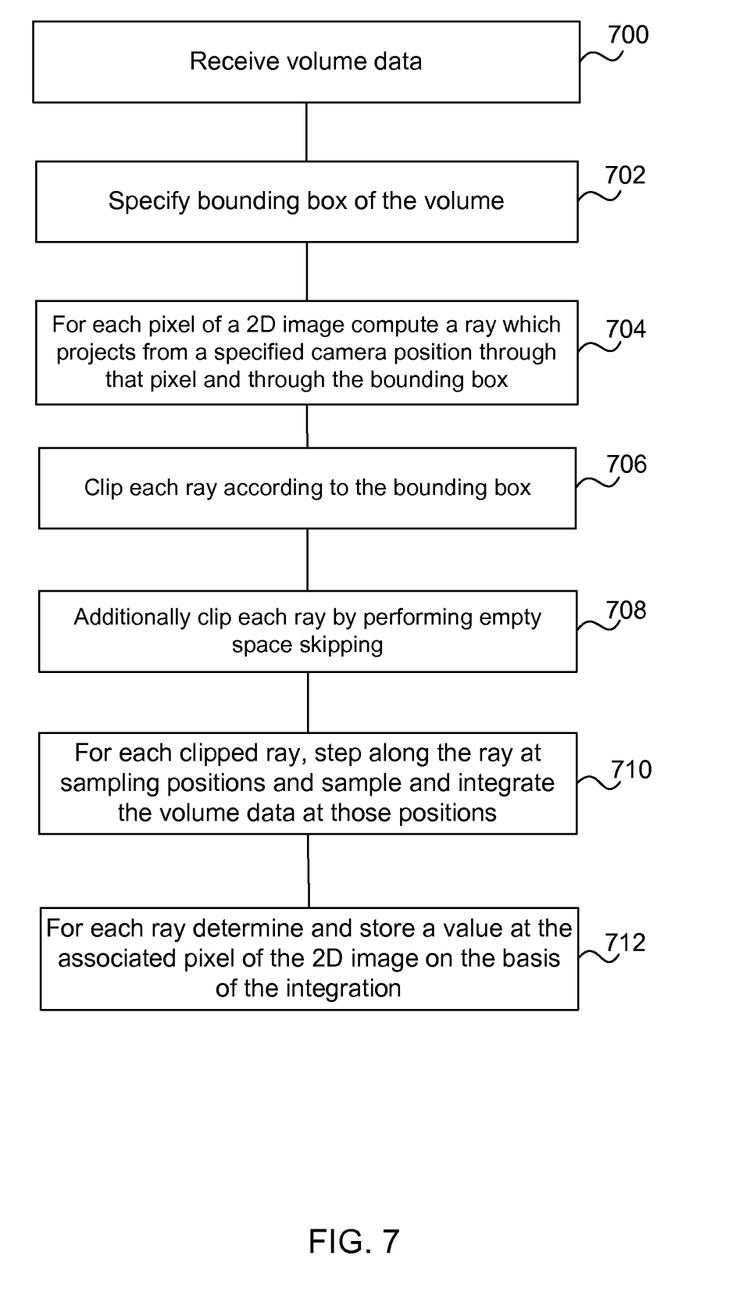
FIG. 7 is a flow diagram of image rendering using ray-casting.

A ray-casting engine may implement any suitable ray-casting process. An example of medical image rendering using ray-casting is now described. For each pixel 610 of the final image, a ray 602, 604, 606, 608 is calculated through the medical image. The medical image 616 is delineated by being enclosed within a bounding box. In this example the bounding primitive is a box. However, it may be any appropriate geometric shape. Along the part of the ray of sight that lies within the medical image, sampling points are selected. The sampling points may be specified by a user on an ad-hoc basis, specified in advance using variables to determine the number of sampling points, generated randomly or selected by any other suitable method. In general the medical image 616 is not aligned with the rays and sampling points are usually located between voxels. The values of the sampling points may be interpolated from the surrounding voxels. For each sampling point, a gradient is computed. The gradient represents the orientation of local surfaces of an object 614 within the medical image. The samples are shaded according to their surface orientation and the source of light in the scene. After all sampling points have been shaded they are composited along the ray of sight, resulting in the final color value for the pixel 610 that is currently being processed. The final color value of the pixel being processed depends on the transparency, opacity, texture and other values of the voxels intersecting the ray. What is rendered at each pixel 610 of the image is therefore the portion of the object that would be seen in that pixel if the screen were a transparent screen between the object 612 in the three dimensional medical image and the situated camera 600. FIG. 7 is a flow diagram of an example of volume rendering using ray-casting which may be implemented at the rendering engine 112. Volume data (being a medical image) is received 700 by the ray-casting engine. A bounding box is specified 702 or provided by the visualization engine. For each pixel of a two dimensional image a ray is computed 704 which projects from a specified camera position through a pixel and through the bounding box. Each ray is clipped according to the bounding box 706 and any clipping plane specified by the visualization engine. Optionally, each ray is then additionally clipped by performing empty space skipping 708. The sampling positions on each ray are stepped along, sampled and the volume data is integrated 710 at those positions. For each ray a value is determined 712 at the associated pixel of the two dimensional image on the basis of the integration.

Figure 8:
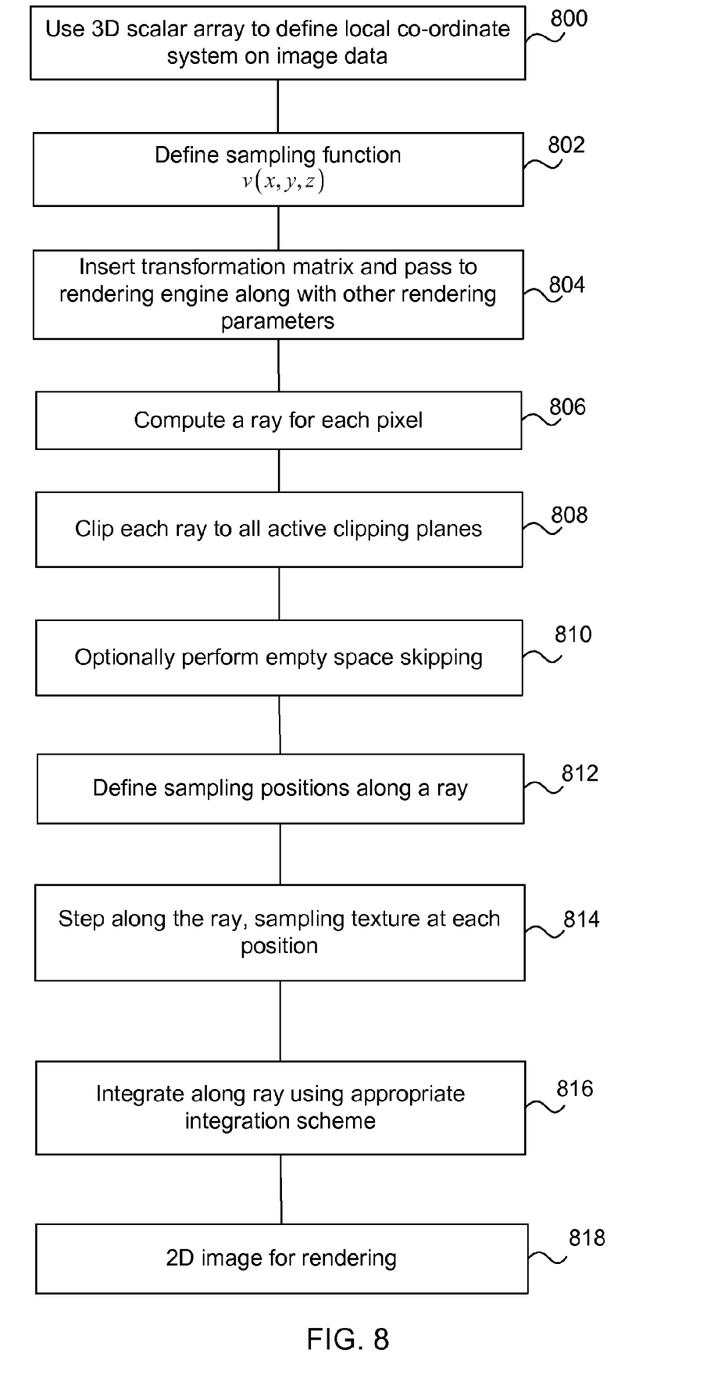
FIG. 8 is a flow diagram of another example of image rendering using ray casting.

With reference to both FIGS. 7 and 8, a three dimensional scalar array of dimension (w,h,d) may be used 800 to define a local co-ordinate system on the volume data. These discrete values in conjunction with trilinear texturing, may be used to define 802 a sampling function $V(x, y, z):^3 \rightarrow [0,1]$. In alternative examples a different form of texturing may be used such as nearest neighbor interpolation, bilinear texturing or anisotropic texturing. It is desired to render the volume to an image $I(x, y):\Omega \subset ^2 \rightarrow [0,1]^4$. An example of the image rendered is an ARGB (alpha, red, green, blue) image. ARGB images allow partial transparency which is useful for medical images which need to be of diagnostic quality.

A 4-by-4 transformation matrix P is provided 804 which projects from volume co-ordinates to image co-ordinates. The third row of P allows for near and far clipping planes to be specified.

A ray-casting process begins by computing 806 a ray $r(\lambda) = a + \lambda \hat{d}$ 704 for each pixel. The ray is computed starting from a specified camera position. The camera may be an affine or perspective camera and may be inside or outside the bounding box. For an image pixel with index (x, y), $a=s(0)$, where $s(z) = \lfloor P^{-1}(x+0.5, y+0.5, z, 1) \rfloor$, $\lfloor . \rfloor$ represents the operation of de-homogenizing a vector by dividing its entries by its last component. Then $d=s(1)-a$ and $\hat{d}=d/|d|$.

Before integration each ray is clipped 808 to all the active clipping planes. These planes include both the bounding box of the volume and any planes specified by the visualization engine. Each clipping plane $\pi$ is a 4-vector such that a point (x, y, z) is visible if $\pi^T(x, y, z, 1) > 0$. $\lambda_{near}$ and $\lambda_{far}$ are updated by intersecting each ray with each clipping plane.

Empty space skipping may optionally be performed 708, 810. Empty space skipping is a beneficial optimization carried out in volumetric ray-casting because each ray may be sampled hundreds of times in each volume. This is very computationally expensive so it is desirable to avoid wasting resources stepping along empty pixels. Any suitable empty space skipping process may be used.

For each clipped ray sampling positions along the ray may be defined 812 as $\{r(\lambda_j)\}$ for $\lambda_j = \lambda_{near} + \lambda_{step}$ and $j \in \{0, (\lambda_{far} - \lambda_{near}/\lambda_{step})$. $\lambda_{step}$ may be 1 but can be any integer value. The ray is then stepped 814 along 310 at these positions, sampling the texture at each position as $V(r(\lambda))$.

Any appropriate method of integration 816 can be used to determine the color value of each pixel. The result of the integration is a color value for each pixel of the two dimensional image 818 determined on the basis of the integration 712. In an example maximum intensity projection (MIP) integration is used. The result of the integration is the maximum of the sampled scalar values along the ray $I(x, y) = \max_j \{V(r(\lambda_j))\}$. Minimum and average values can be similarly computed.

In a further example alpha blending integration is used. Alpha blending is a convex combination of two colors allowing for transparency effects. An associated or pre-multiplied ARGB color vector is updated along each ray as $c = c + (1 - c_\alpha) src_j$, where $src_j$ represents the amount of light and opacity emitted or reflected along the viewing direction at position $r(\lambda_j)$. A transfer function is supplied as a set of key-points $\{(x, \alpha, r, g, b)_j\}$, where $\alpha$ represents a level of transparency. The transfer function may be provided by the visualization engine as described above. Such that $\forall j: x_j, \alpha_j \in [0,1]$ and $r_j, g_j, b_j \leq \alpha_j$ are pre-multiplied colors. A sampling function $T(x):[0,1] \rightarrow [0,1]^4$ can then be defined which maps scalar volume values to colors and opacities. In this example $src_j = T(V(r(\lambda_j)))$ but the sampling function may be any appropriate function.

Pre-integration of the transfer function can be used to avoid unnecessary aliasing where the transfer function may contain high frequencies. In this case $src_j = T_{2D}(V(r(\lambda_{j-1})), V(r(\lambda_j)))$, where $T_{2D}:^2 \rightarrow [0,1]^4$ is a pre-computed texture such that $$T_{2D}(x, y) = \begin{cases} \int T(\tau) d\tau / (y - x) & (x \neq y) \\ T(x) & (x = y) \end{cases}.$$

Gradients are estimated during integration using 6-point finite differences in order to perform shading:

$$\nabla V(x, y, z) \approx \frac{1}{2\delta} \begin{bmatrix} V(x + \delta, y, z) - V(z - \delta, y, z) \\ V(x, y + \delta, z) - V(x, y - \delta, z) \\ V(x, y, z + \delta) - V(x, y, z - \delta) \end{bmatrix}.$$

Optionally the ray start position can be jittered by up to one voxel in the direction of the ray in order to mitigate wood grain artifacts. In this case $\lambda_j = \lambda_{near} + (j + J(i, j))\lambda_{step}$, where $J(i, j):^2 \rightarrow [0,1]$ is a pre-computed jitter texture.

Optionally early ray termination can be implemented such that if $c_\alpha$ becomes sufficiently close to 1 during integration the ray computation may be considered finished. This is because the object which is being rendered is sufficiently opaque that nothing that is behind it is visible from the viewpoint of the situated camera.

Figure 9:
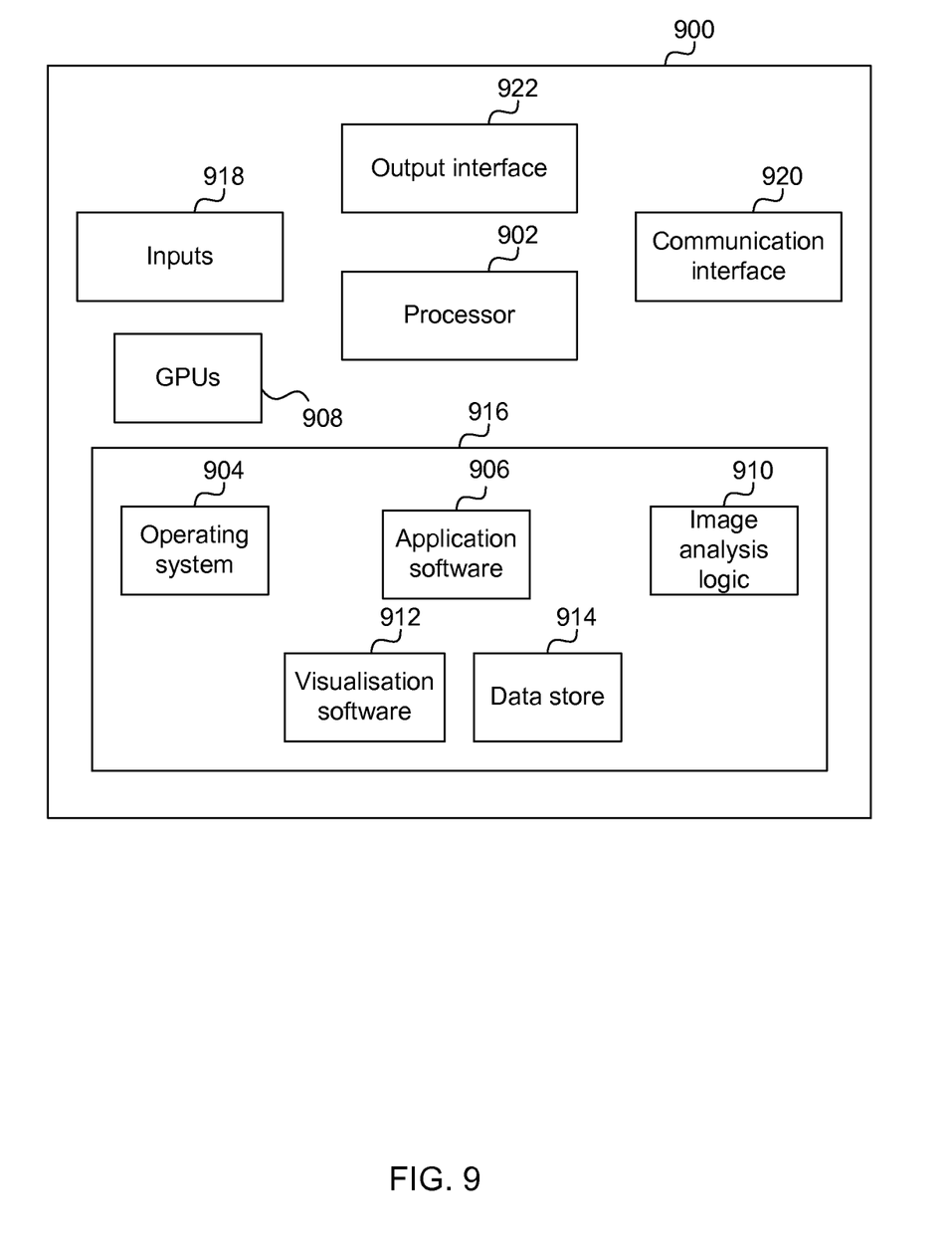
FIG. 9 illustrates an exemplary computing-based device in which embodiments of a visualization engine may be implemented.

FIG. 9 illustrates various components of an exemplary computing-based device 900 which may be implemented as any form of a computing and/or electronic device, and in which embodiments of a medical image rendering system may be implemented.

The computing-based device 900 comprises one or more inputs 902 which are of any suitable type for receiving user input, for example medical images for rendering, media content, Internet Protocol (IP) input. The device also comprises communication interface 904 for communicating with one or more communication networks, such as the internet (e.g. using internet protocol (IP)) or a local network. The communication interface 904 can also be used to communicate with one or more external computing devices, and with databases or storage devices.

Computing-based device 900 also comprises one or more processors 906 which may be microprocessors, controllers or any other suitable type of processors for processing computing executable instructions to control the operation of the device in order to perform image rendering. The device also comprises one or more graphics processing units 908 for graphics rendering. Platform software comprising an operating system 916 or any other suitable platform software may be provided at the computing-based device to enable application software 912 to be executed on the device.

The computer executable instructions may be provided using any computer-readable media, such as memory 914. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 900 it will be appreciated that the storage may be distributed or located remotely and accessed via a network or other communication link (e.g. using communication interface 904).

A display interface 910 is also provided such as an audio and/or video output to a display system integral with or in communication with the computing-based device. The display system may provide a graphical user interface, or other user interface of any suitable type although this is not essential. Any other suitable type of output may also be provided.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
    at an input receiving at least one estimated organ center obtained from a medical image, the medical image being obtained from an imaging device, each estimated organ center having an associated organ classification label;
    using a user interface to display an organ name for each estimated organ center;
    at the user interface, receiving user input specifying at least one of the organ names;
    arranging a visualization engine to select a transfer function according to the specified organ name;
    arranging the visualization engine to select a camera location according to the estimated organ center of the specified organ name;
    arranging the visualization engine to select a clipping plane based on maximizing a surface area of a structure of interest in a two-dimensional image, the clipping plane being a cross-section of the medical image;

using a rendering engine to render the two-dimensional image from the medical image using the selected camera location and transfer function; and using the user interface to display the two-dimensional image such that a foreground region associated with the specified organ name is visualized.

2. A method as claimed in claim 1 comprising arranging the visualization engine to select a bounding region and to center that bounding region on the estimated organ center of the specified organ name; and to provide that centered bounding region to the rendering engine for use when rendering the two-dimensional image.

3. A method as claimed in claim 2 comprising arranging the visualization engine to select the bounding region using the specified organ name and training data.

4. A method as claimed in claim 1 comprising at the input, receiving an organ classification for each image element of the medical image; arranging the visualization engine to select at least one other transfer function using the image element organ classifications; and using the rendering engine to render the two-dimensional image using the transfer functions according to the image element organ classifications.

5. A method as claimed in claim 1 comprising at the input, receiving an organ classification and associated probability for each image element of the medical image; arranging the rendering engine to render the two-dimensional image such that the opacity of each image element of the two-dimensional image is related to the organ classification probabilities of the associated medical image elements.

6. A method as claimed in claim 1 comprising at the input, receiving an organ classification and associated probability for each image element of the medical image and arranging the rendering engine to render the two-dimensional image such that the color of each image element of the two-dimensional image is related to the organ classifications of the associated medical image elements.

7. A method as claimed in claim 1 comprising arranging the visualization engine to provide the clipping plane to the rendering engine for use when rendering the two-dimensional image.

8. A method as claimed in claim 1 wherein using the rendering engine comprises using a ray-casting engine to render the two-dimensional image by computing rays extending from the camera location through the two-dimensional image and into the medical image and carrying out integration along those rays.

9. A method as claimed in claim 1 wherein receiving user input comprises receiving a single-click specifying at least one of the organ names.

10. A method as claimed in claim 1 wherein the medical image is selected from any of: a magnetic resonance image scan, a computed tomography scan, a single photon emission computed tomography image, positron emission tomography image, DTI tractography image and ultra-sound scan.

11. A medical image visualization engine comprising:
an input arranged to receive a plurality of estimated organ centers obtained from a medical image of at least three dimensions, each estimated organ center having an associated organ classification label;
a data store comprising the medical image, the medical image being obtained from an image capture device;
a user interface arranged to display an organ name for each estimated organ center;
the user interface also arranged to receive user input specifying at least one of the organ names;
a visualization engine arranged to select a transfer function according to the specified organ name;
a processor arranged to select a camera location according to the estimated organ center of the specified organ name and to select a clipping plane based on maximizing a surface area of a structure of interest in a two-dimensional image;
a rendering engine arranged to render the two-dimensional image from the medical image using the selected camera location and transfer function; and
the user interface being arranged to display the two-dimensional image such that a foreground region associated with the specified organ name is visualized.

12. An apparatus as claimed in claim 11 wherein the user interface is arranged to display the two-dimensional image in a display window that is substantially centered on the estimated organ center of the specified organ name.

13. An apparatus as claimed in claim 11 wherein the input is arranged to receive an organ classification for each image element of the medical image; the visualization engine is arranged to select at least one other transfer function using the image element organ classifications; and the rendering engine is arranged to render the two-dimensional image using the transfer functions according to the image element organ classifications.

14. An apparatus as claimed in claim 11 wherein the input is arranged to receive an organ classification and associated probability for each image element of the medical image; and the rendering engine is arranged to render the two-dimensional image such that the opacity of each image element of the two-dimensional image is related to the organ classification probabilities of the associated medical image elements.

15. An apparatus as claimed in claim 11 wherein the input is arranged to receive an organ classification and associated probability for each image element of the medical image; and the rendering engine is arranged to render the two-dimensional image such that the color of each image element of the two-dimensional image is related to the organ classifications of the associated medical image elements.

16. An apparatus as claimed in claim 11 wherein the visualization engine is arranged to select a bounding region and to center that bounding region on the estimated organ center of the specified organ name; and to provide that centered bounding region to the rendering engine for use when rendering the two-dimensional image.

17. An apparatus as claimed in claim 11 wherein the visualization engine is arranged to provide that clipping plane to the rendering engine for use when rendering the two-dimensional image.

18. An apparatus as claimed in claim 11 wherein the rendering engine comprises a ray-casting engine arranged to render the two-dimensional image by computing rays extending from the camera location through the two-dimensional image and into the medical image and carrying out integration along those rays.

19. A computer-implemented method comprising:
at an input receiving at least one estimated organ center obtained from a medical image of at least three dimensions, the medical image being obtained from an imaging device, each estimated organ center having an associated organ classification label; and also receiving an organ classification probability for each image element of the medical image;
using a user interface to display an organ name for each estimated organ center;
at the user interface, receiving user input specifying at least one of the organ names;
arranging a visualization engine to select a first transfer function for the foreground of a two-dimensional image and a second transfer function for the background of the two-dimensional image according to the specified organ name, the first and second transfer functions being independent of each other;

arranging the visualization engine to select a camera location according to the estimated organ center of the specified organ name;

arranging the visualization engine to select a clipping plane based on maximizing a surface area of a structure of interest in the two-dimensional image; and using a rendering engine to render the two-dimensional image from the medical image using the selected camera location and transfer functions and such that the opacity of the image elements of the two-dimensional image are related to the organ classification probabilities.

20. A method as claimed in claim 19 which comprises arranging the user interface to display the two-dimensional image such that it is substantially centered on the estimated organ center of the specified organ name.

* * * * *